United States Patent [19]

Eberle

[11] 4,294,292

[45] Oct. 13, 1981

[54] TUMBLE DUMPER

[75] Inventor: William J. Eberle, Reading, Pa.

[73] Assignee: General Battery Corporation, Reading, Pa.

[21] Appl. No.: 90,477

[22] Filed: Nov. 1, 1979

[51] Int. Cl.³ .............................................. B65B 21/08
[52] U.S. Cl. .......................................... 141/1; 141/92; 141/98; 198/412; 414/415; 414/418; 414/419
[58] Field of Search ............... 141/1, 98, 92; 414/415, 414/418, 419; 198/412

[56] References Cited

U.S. PATENT DOCUMENTS

| 597,114 | 1/1898 | Jamieson | 271/81 |
|---|---|---|---|
| 1,914,656 | 6/1933 | Walker | 656/248 |
| 1,967,683 | 7/1934 | Ostrander | 414/680 |
| 2,226,068 | 12/1940 | Mosley et al. | 414/419 |
| 2,528,266 | 10/1950 | Daily et al. | 204/194 |
| 2,756,883 | 7/1956 | Schreck | 414/420 |
| 2,766,469 | 10/1956 | Kaye | 15/3 |
| 2,832,090 | 4/1958 | Ross | 15/304 |
| 2,836,281 | 5/1958 | Cookson | 198/404 |
| 2,862,629 | 12/1958 | Aberle | 414/771 |
| 2,865,411 | 12/1958 | Johnson et al. | 141/92 |
| 2,901,135 | 8/1959 | Stadelman | 414/415 |
| 2,988,239 | 6/1961 | Miller et al. | 414/419 |
| 3,167,196 | 1/1965 | Eberle | 414/415 |
| 3,192,875 | 7/1965 | Kroeger et al. | 105/271 |
| 3,314,554 | 4/1967 | Cuniberti | 414/739 |
| 3,623,620 | 11/1971 | Vermette | 414/420 |
| 3,779,410 | 12/1973 | Phillips et al. | 414/418 |
| 3,863,775 | 2/1975 | Toback | 414/771 |
| 4,081,093 | 3/1978 | Eberle | 414/421 |

FOREIGN PATENT DOCUMENTS 286843 3/1928 United Kingdom.

Primary Examiner—Houston S. Bell, Jr.
Attorney, Agent, or Firm—Benasutti Associates, Ltd.

[57] ABSTRACT

An automatic tumble dumper for automatically removing the electrolyte from lead-acid storage batteries and particularly batteries intended for automotive use is disclosed. The device comprises carrier means adapted to transport the batteries through the system. Once the batteries are inside the unit, upset means automatically turn them first onto their side and then invert them so that the bulk of the electrolyte passively drains out. To achieve complete electrolyte removal, the batteries are jostled via a jostling means which cooperates with said carrier to actively shake the batteries as they travel through the device. At the conclusion of this shaking, now drained batteries are returned to an upright position and travel out of the machine for further processing.

22 Claims, 3 Drawing Figures

TUMBLE DUMPER

BACKGROUND OF THE INVENTION

This invention generally relates to an apparatus for inverting and dumping acid or other liquids from the cases of lead acid batteries particularly automotive batteries.

One problem which occurs in the manufacture and maintenance of lead storage batteries for automotive use, is that of removing the electrolyte from the battery interior. For relatively small automotive batteries this can be done simply by removing the filling caps, inverting the battery over a suitable container and holding it in there until all of the electrolyte drains out. For small quantities of batteries this is the normal procedure. However, if this is a routine manufacturing operation, as in the fabrication of so called "damp charged" batteries, such manual operations are not only slow and labor intensive and therefore uneconomical but can be quite hazardous as well. As a result, there has been a desire to make this operation automatic, and a number of devices have been developed for this purpose.

When one looks at these devices, it is found that they all suffer from a variety of drawbacks. One in particular, is that they are not readily adapted to automatic high volume operation, particularly with batteries that have terminals coming out of the top. In other cases the means by which the battery is grasped and turned over to achieve such drainage have a distinct tendency to damage the battery by either cracking the case or breaking the seal around the electrodes. In other cases, the apparatus still requires some manual operation so that it creates a significant hazard to personnel working nearby. The subjection invention is designed to correct these problems, in that it operates both automatically and positively to control the discharge of the electrolyte with a minimum of hazard both to the battery itself and to personnel working nearby.

BRIEF DESCRIPTION OF THE INVENTION

The subject invention is a device intended to automatically overturn and actively engage an automotive storage battery so that the electrolyte therein may be completely discharged into a suitable container. In its most basic construction, the device comprises a pair of coordinated belts which travel down the length of the machine. The first of these belts is designed to receive the batteries, which are placed thereon in an upright, lengthwise oriented position so they may be fed into the machine. Associated with this belt are alignment means which are adapted to place the battery in the proper position for subsequent discharge operation. The batteries may be placed on the belt by any convenient means and no particular spacing is required. Also, since the batteries are not gripped at any time, different sized batteries may easily be accommodated.

Downstream from the receiving point is a sensor which detects the presence of a battery on the belt. When this happens it activates an upsetter which turns the battery on its side and pushes the battery off the belt onto a downwardly tilted pivotable shelf, located alongside the belt. In this position a large part of the acid within the battery will drain out into the container below. The shelf has associated activation means which after pre-set time delay cause it to rotate about its pivot with the result that the battery flips over onto its top while sliding off onto the second coordinated belt.

The second belt is activated by the same mechanism which operates the first belt and travels at the same speed. It has impressed on it a set of regularly spaced rubber cleats, which are of such height, that the electrodes coming through the top of the battery will hang freely between them in a downward position without having to bear the weight of the overturned battery, thus preventing damage to the battery. Although most of the electrolyte remaining within the battery case drains out by this passive technique there is still a significant fraction of the electrolyte remaining in the pores and microcracks of the plates and, particularly, the separators. To assure that this and any other quantities of electrolyte which might have been trapped in crevices or relatively blind areas of the interior are also removed, a more active approach is required. To do this the device incorporates oscillatory vibrating means which cooperate with the second belt to shake or jostle the battery from side to side as it travels down the length of the machine. This jostling action effectively causes most if not all of the trapped electrolyte to run out of the battery by the time it reaches the end of the machine.

When the battery reaches the far end of the machine, a second sensing apparatus detects the presence of the battery and actuates a second upset operation. This acts to put the battery back on its side on a pivotable second shelf which, when rotated will cause the battery to flip back over and right itself back on the first belt and exit from the machine for subsequent processing. Because the empty battery is quite top heavy at this time, means are incorporated so that the battery on being flipped up will stay in an upright position and not turn over again onto its other side.

When the battery exits the machine it can be off loaded and moved to the next operation. As with loading such unloading can be done by any convenient means, thus minimizing to the greatest extent any possible exposure of the operator to the sulfuric acid electrolyte.

Thus it can be seen that there has been provided an apparatus and method for removing electrolyte from automotive storage batteries that is safe, economical and automatic in operation. It can be readily designed to handle all sizes of automotive batteries and requires a minimum of manual operation, thus overcoming all the basic problems found in prior art equipment.

It is a primary object of the subject invention to provide an automatic means for actively removing the acid electrolyte from lead acid automotive batteries.

It is another object to provide a device for removing the electrolyte from batteries in a manner which presents little or no hazard to operating personnel or nearby equipment.

Other and further objects of this invention will become obvious from a consideration of the preferred embodiment of the subject invention.

DETAILED DESCRIPTION OF THE INVENTION

Figure 1:
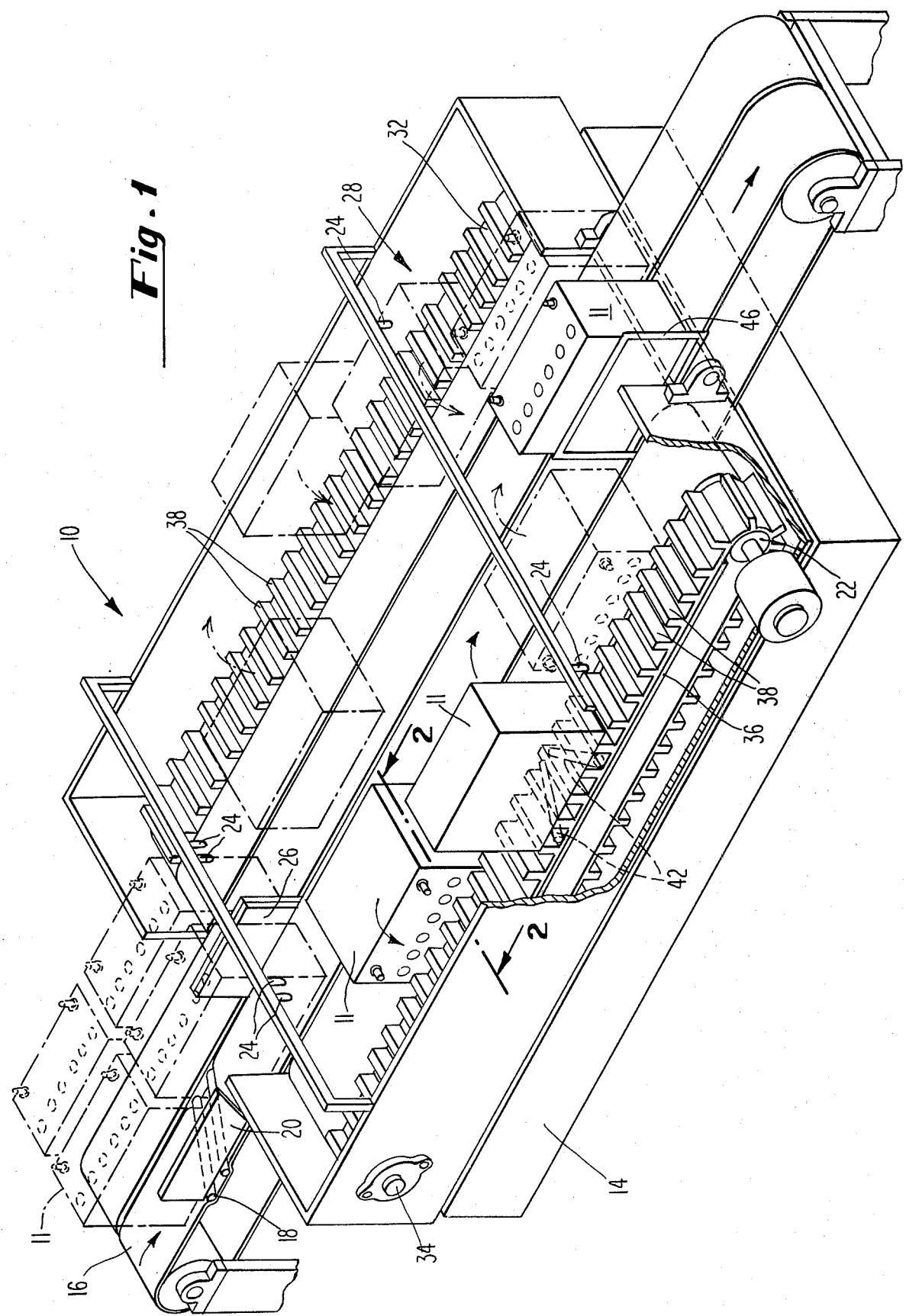
FIG. 1 is an isometric plan view of the subject invention showing the location of all the major parts and the method of operation.

Referring now to FIG. 1 we see an isometric view of one embodiment of the subject invention 10 for automatically and actively removing acid electrolyte from lead acid storage batteries 11, particularly, relatively small automotive type batteries produced in high volume operations. As shown the operating system 12 is positioned over a more or less rectangular receiver tank 14 into which the electrolyte will be discharged. Looking now in detail at system 12, we see that it comprises a central loading belt 16 which starts outside the front end of the machine, and after clearing the top edge at the front of tank 14 travels down its length exiting over the back wall of said tank. The batteries 11 which are to be emptied after their filling caps have been removed, are placed in an upright, generally lengthwise aspect on belt 16 which then carries them into the device. The spacing between and method of placing the batteries are not particularly critical and loading may be done either automatically or by hand. If the latter, this is one of the few times where the batteries need to be touched by an operator during this operation.

In the embodiment shown in FIG. 1, the machine is capable of receiving two batteries, more or less side by side at a time. However, to simplify the subsequent discussion, it will be in terms of only one being processed. As noted above, the batteries are placed on belt 16 more or less in lengthwise position. However, for subsequent processing it is necessary that they be precisely aligned. This is done when the batteries pass over alignment means 18 such as canted rollers dispersed roughly in a slanted pattern. These act to direct the battery along a guide rail 20 which straightens it out and aligns it precisely with the lengthwise dimention of the belt. The belt itself is driven by a main roller 22 which is located at the back of the device. All of the belt operations are controlled by this roller which serves to maintain the synchronization of the system. After alignment, the batteries 11 travel into the interior of the device, where after passing over the front edge of tank 14, they act to intercept one of a set of sensors 24, preferably "electric eye" type devices which serve to initiate all of the active functions of the system.

Figure 2:
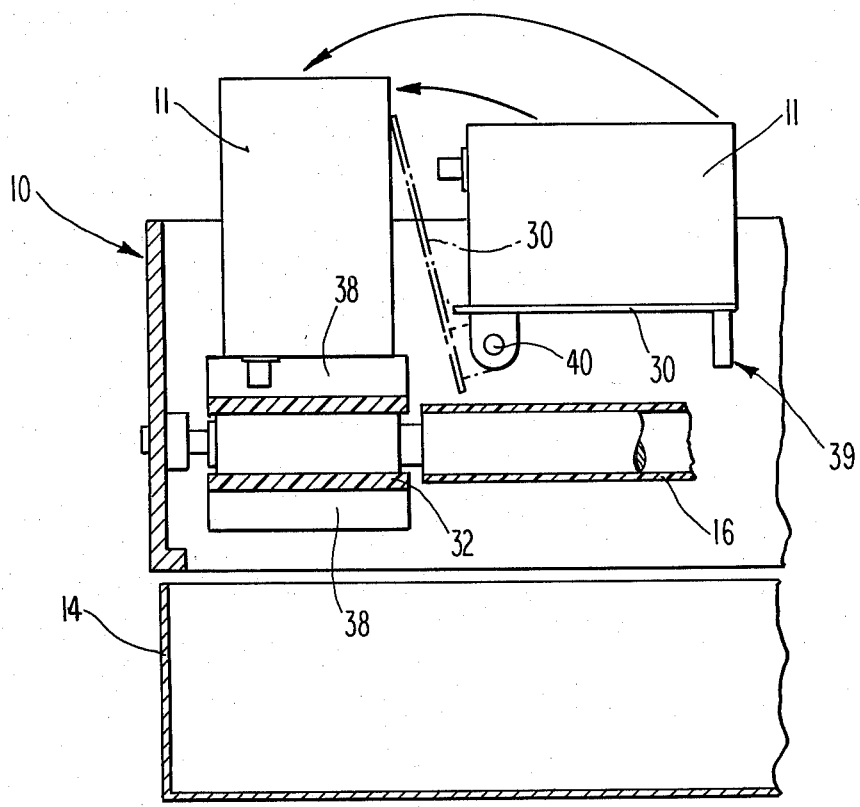
FIG. 2 is a plan view along line 2—2 showing the operation of the upset mechanism in the subject machine.

When sensor 24 detects the presence of a battery on belt 16 it activates upset means 26, such as a cam located under the belt or a push rod, which cause the battery to fall over on its side and off of the belt onto a downwardly tilting, rotatable shelf 30 which is located adjacent to belt 16. In this position a percentage of the electrolyte within the battery will passively drain out through the open filling holes in the top. This is shown in FIG. 2.

Figure 3:
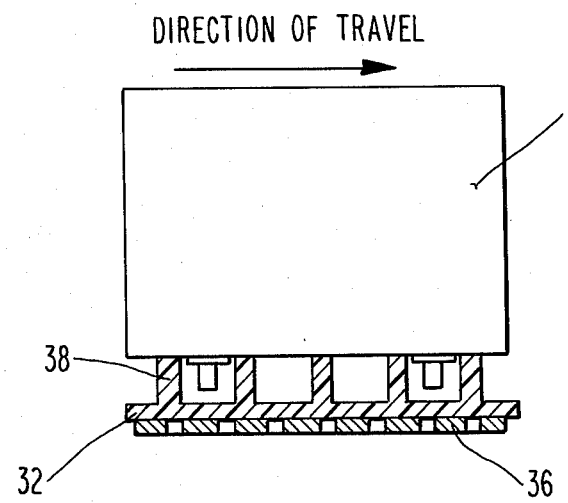
FIG. 3 is a detailed view of the cleats on the second transport tape.

Located adjacent to shelf 30 and operating off of roller 22 are a pair of second belts 32 which are located along the outer sides of tank 14 and travel between first roller 22 and a second roller 34 which is located at the forward end of the device. The upper side of this belt travels over a perforated shelf 36 preferably of stainless steel which serves to keep belt 32 from saging. Belt 32 is made from an acid resistant polymeric material, such as rubber or neoprene, and differs from belt 16 in that it is not smooth. Rather on its top surface there is a plurality of cleats 38, approximately 2 to 2½ inches high and regularly spaced along the length of the belt. As will herein below be explained these cleats support the battery during the remaining emptying operations which occur. (FIG. 3)

Shelf 30 further comprises activation means 39. These after a preset time delay act to cause shelf 30 to rotate about its pivot 40, flipping battery 11 about its lower corner and onto its top while projecting it onto belt 32 which carries it through the rest of the machine. In this position the battery rests in cleats 38 which allow the battery electrodes to hang freely without bearing any of the weight of the battery. In this inverted position virtually all of the free electrolyte in the battery will passively drain out into container 14. Not all of the acid drains out, however. There is always some residual small quantity which is trapped in pores and microcracks of the plates and, particularly, the separators, or which becomes trapped within blind areas or in crevices in other structural features of the battery. To assure maximum removal of its residual electrolyte belt 32 travels over oscillating means 42, such as a set of canted rollers, which act to impart an oscillatory vibrating motion to the battery so that it jostles it first to one side and then the other several times as it travels down the length of the machine. By so doing, this residual electrolyte is actively freed to be discharged out of the battery.

When battery 11 reaches the far end of the machine, it intercepts a second sensor 24. As with the action at the entrance of the machine, this activates a second upset means 28 which now acts to upset the now empty battery back onto its side while moving it off of second belt 32 onto pivotable second shelf 44. Shelf 44 also comprises activation means 39 which cause it to rotate and flip the now "damp" battery back onto belt 22 in an upright position. To prevent the top-heavy, dry battery from continuing to roll over, there is a barrier plate 46 which acts to keep the battery in an upright position. Belt 22 then travels out of the back end of device 12 at which point the batteries can be removed for subsequent testing.

It will be understood that various changes in the details, materials and arrangement of parts which have been herein described and illustrated in order to explain the nature of this invention may be made by those skilled in the art within the principle and scope of the invention as expressed in the following claims.

It will further be understood that the "Abstract of the Disclosure" set forth above is intended to provide a non-legal technical statement of the contents of the disclosure in compliance with the Rules of Practice of the United States Patent and Trademark Office, and is not intended to limit the scope of the invention described and claimed herein.

What is claimed is:

1. An apparatus for automatically dumping the electrolyte from lead-acid storage batteries having filling holes defined in a top surface thereof into a container comprising:
    (a) carrier means for receiving said batteries in an upright position and for carrying them through said apparatus;
    (b) sensing means for detecting the presence of a battery on said carrier means;
    (c) flipping means activated by said sensing means for inverting said battery;
    (d) oscillation means cooperating with said carrier means to actively remove said electrolyte from said batteries by periodically jostling said batteries; and (e) righting means for returning said inverted battery to an upright position on said carrier means for subsequent processing.

2. The apparatus of claim 1 wherein said carrier means further comprises:
(a) a first belt for receiving said upright batteries and carrying them into and out of said apparatus;
(b) alignment means for placing said batteries in the proper position for subsequent processing;
(c) a second belt for receiving said inverted batteries and carrying them through the apparatus; and
(d) means for driving said first and second belts.

3. The second belt of claim 2 further comprising a plurality of regularly spaced cleats disposed over the outside surface of said belt.

4. The apparatus of claim 3 wherein said flipping means comprises:
(a) means for upsetting said upright batteries onto their sides and ejecting them from said first belt;
(b) downwardly tilting rotatable shelf means adapted to receive said upset battery;
(c) activation means causing said shelf to rotate so that said upset battery is flipped onto said second belt in said overturned position.

5. The apparatus of claim 4 wherein said oscillating means comprises tilting means adapted to periodically jostle said inverted batteries so as to actively cause said electrolyte to be discharged into said container.

6. The apparatus of claim 5 wherein said righting means comprises:
(a) a second upset means for turning said inverted battery onto its side;
(b) a second rotatable shelf means to receive said upset battery;
(c) second activation means to rotate said second shelf while flipping said battery into an upright position as it slides off of said shelf onto said first belt; and
(d) a barrier for preventing said uprighted battery from turning over.

7. The apparatus of claim 6 wherein said sensing means is an electric eye and further comprising timing means adapted to control the activation of said flipping means and said righting means.

8. The belt of claim 3 wherein said belt is made of an acid resistant polymer.

9. The method of actively removing electrolyte from lead-acid storage batteries having filling holes defined in a top surface thereof comprising:
(a) carrying the batteries into an automatic apparatus;
(b) inverting said batteries over a receiver tank;
(c) jostling the batteries so that all of the electrolyte therein is actively removed; and
(d) righting the batteries so that they may be carried out of the machine for further processing.

10. An apparatus for automatically dumping electrolyte from a storage battery having openings defined in a surface thereof, the apparatus comprising:
(a) first and second carrying means, positioned in juxtaposed spaced relation to each other, for carrying said batteries through said apparatus, and
(b) first means for transferring at least one of said batteries from said first carrying means to said second carrying means while simultaneously rotating said battery so that the openings of said battery are directed downwardly.

11. The apparatus of claim 10 further comprising second means for transferring said battery from said second carrying means to said first carrying means for delivery from said apparatus.

12. The apparatus of claim 11 wherein said second transferring means include means for simultaneously rotating said battery from its downwardly directed orientation back, substantially, to the orientation of the battery before its transfer from the first carrying means to the second carrying means.

13. The apparatus of claim 12 wherein the openings of the battery are substantially non-inverted when the battery is located on said first conveying means, and are substantially inverted when the battery is located on said second conveying means.

14. An apparatus for automatically dumping the electrolyte from storage batteries having openings defined in a top surface thereof, the apparatus comprising:
(a) means for carrying said batteries through said apparatus;
(b) flipping means for flipping over and inverting said battery while transferring said battery from said carrying means to secondary handling means; and
(c) righting means for returning said inverted battery from said secondary handling means, in an upright position, on said carrier means.

15. An apparatus for automatically dumping the electrolyte from storage batteries having openings defined in a top surface thereof, the apparatus comprising:
(a) carrier means for conveying said batteries through said apparatus; and
(b) flipping means for removing said batteries from said carrier means while also inverting said batteries over a dumping station.

16. The apparatus of claim 15 further comprising means for returning said inverted batteries to said carrier means for delivery from said apparatus.

17. A method for dumping electrolyte from storage batteries having openings defined in a top surface thereof, the method comprising:
(a) conveying the batteries to an automatic battery flipping apparatus positioned along a first conveyor means;
(b) flipping said batteries from said first conveyor means onto a second conveyor means juxtaposed with said first conveyor means, inverting said batteries; and
(c) dumping said electrolyte from said batteries through said openings.

18. The method of claim 17 further comprising the steps of:
(a) flipping said inverted, dumped batteries from said second conveyor means back onto said first conveyor means; and
(b) delivering said dumped batteries from said apparatus for subsequent handling.

19. The method of claim 18 further comprising the step of jostling the inverted batteries during dumping to release electrolyte trapped within the structure comprising each battery.

20. The method of claim 17 wherein the flipping comprises:
(a) upsetting non-inverted batteries introduced into said apparatus onto their sides while ejecting them from said first conveyor means;
(b) delivering said upset batteries onto a downwardly tilting rotatable shelf means; and
(c) causing said rotatable shelf means to rotate, flipping said batteries into an inverted position and onto said second conveyor means.

21. The method of claim 17 further comprising the step of sensing the presence of the batteries in the vicinity of the apparatus for flipping said batteries and actuating said flipping apparatus in response to said sensing.

22. The method of claim 17 wherein the conveying, flipping and dumping are performed on a substantially continuous basis.

* * * * *